(12) United States Patent
Kim et al.

(10) Patent No.: US 9,415,714 B2
(45) Date of Patent: Aug. 16, 2016

(54) LUMBER SUPPORT APPARATUS FOR VEHICLE

(71) Applicants: Hyundai Motor Company, Seoul (KR); Ewon Comfortech Co. Ltd., Nonsan-si (KR)

(72) Inventors: Tae Jo Kim, Ulsan (KR); Hoon Hee Choi, Daejeon (KR)

(73) Assignees: Hyundai Motor Company, Seoul (KR); Ewon Comfortech Co. Ltd., Nonsan-si (KR)

( * ) Notice: Subject to any disclaimer, the term of this patent is extended or adjusted under 35 U.S.C. 154(b) by 0 days.

(21) Appl. No.: 14/570,330

(22) Filed: Dec. 15, 2014

(65) Prior Publication Data

US 2016/0052436 A1    Feb. 25, 2016

(30) Foreign Application Priority Data

Aug. 22, 2014 (KR) .......................... 10-2014-0109329

(51) Int. Cl.
*A47C 7/46* (2006.01)
*B60N 2/66* (2006.01)

(52) U.S. Cl.
CPC .............. *B60N 2/666* (2015.04); *B60N 2/6673* (2015.04)

(58) Field of Classification Search
CPC ............. B60N 2/66; A47C 7/46; A47C 7/462
USPC .................................. 297/284.4, 284.7, 284.8
See application file for complete search history.

(56) References Cited

U.S. PATENT DOCUMENTS

| | | | | | |
|---|---|---|---|---|---|
| 4,295,681 A | * | 10/1981 | Gregory | ................ | A47C 7/462 297/284.4 |
| 4,339,150 A | * | 7/1982 | McNamara | ............ | A47C 7/462 297/284.8 |
| 4,657,304 A | * | 4/1987 | Heesch | ................ | B60N 2/4864 297/391 |
| 4,762,367 A | * | 8/1988 | Denton | ................ | B60N 2/4864 297/284.8 |
| 4,981,325 A | * | 1/1991 | Zacharkow | ............ | A47C 7/405 297/230.14 |
| 5,088,790 A | * | 2/1992 | Wainwright | ............ | B60N 2/66 297/284.4 |
| 5,553,919 A | * | 9/1996 | Dennis | .................... | A47C 7/462 297/284.8 |
| 7,488,039 B2 | * | 2/2009 | Fischer | ................ | B60N 2/0232 297/284.4 |
| 9,193,287 B2 | * | 11/2015 | McMillen | ................ | B60N 2/66 |
| 2010/0066144 A1 | * | 3/2010 | Schweizer | ............... | B60N 2/66 297/284.8 |

FOREIGN PATENT DOCUMENTS

| | | |
|---|---|---|
| JP | 5-34958 U | 5/1993 |
| KR | 10-2010-0010289 A | 2/2010 |
| KR | 10-2012-0098236 A | 9/2012 |
| KR | 10-2012-0119281 A | 10/2012 |
| KR | 10-2013-0012317 A | 2/2013 |

\* cited by examiner

*Primary Examiner* — Laurie K Cranmer
(74) *Attorney, Agent, or Firm* — Morgan, Lewis & Bockius LLP

(57) ABSTRACT

A lumber support apparatus may include a base plate installed in a fixed wire installed in seatback frame to be elevated, nut units having left and right nuts coupled to upper portions of opposite sides of the base plate to be slid leftwards and rightwards, respectively, link units having left and right links located outside the nut units to be spaced apart from each other and ends of which are hinge-coupled to upper portions of opposite sides of the base plate, respectively, arm units having left and right arms leftward/rightward movements of which are restricted by the link units and raised forwards and rearwards when the nut units are slid, and a screw rod having a screw structure passing the left and right nuts leftwards and rightwards to be screw-coupled to the left nut and right units, for moving the left and right nuts in opposite directions during rotation thereof.

4 Claims, 7 Drawing Sheets

(a) 4-way condition (b) 2-way condition

LUMBER SUPPORT APPARATUS FOR VEHICLE

CROSS-REFERENCE TO RELATED APPLICATION

The present application claims priority to Korean Patent Application No. 10-2014-0109329 filed on Aug. 22, 2014, the entire contents of which is incorporated herein for all purposes by this reference.

BACKGROUND OF THE INVENTION

1. Field of the Invention

The present invention relates to a lumber support apparatus for a vehicle. More particularly, it relates to a lumber support apparatus for a vehicle which is installed in the interior of a seatback of a vehicle to comfortably support portions of a passenger such as the waist and the back of the passenger.

2. Description of Related Art

In general, a seat is installed in the interior of a vehicle such that a passenger can be seated, and the seat includes a seat cushion supporting the bottom of the passenger and a seatback supporting the back of the passenger, an arm rest on which an arm of the passenger may be positioned, and a headrest supporting the head of the passenger.

In a description of the seatback, a seatback frame corresponding to a shell of the seatback is installed within the seatback and a lumber support for supporting the back of a passenger is installed in the seatback frame through a comfort mat.

The seatback employs a variable lumber support which may be adapted to a back shape of the passenger to effective reduce fatigues of the passenger during driving of the vehicle.

In a description of the variable lumber support according to the related art, a comfort mat supporting the waist of the passenger is installed in a protrusion formed in a rotary rod coupled to the seatback frame to be rotated, so that the comfort mat is moved to the front and rear sides of the seatback frame to support the waist of the passenger as the rotary rod is rotated according to the posture of the passenger seated on the seat.

However, in the variable lumber support according to the related art, because the comfort mat installed in the protrusion of the rotary rod can be moved only forwards and rearwards through rotation of the rotary rod, the back of the passenger cannot be optimally supported according to the body condition of the passenger seated on the seat so that the passenger seated on the seat may feel fatigues after long time driving of the vehicle.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a lumber support apparatus for a vehicle which is installed in a seatback frame to move forwards, rearwards, upwards, and downwards to adjust deformation of a comfort mat in a seatback, thereby optimally supporting the back of a passenger according to the body condition of the user The present invention also provides a lumber support apparatus for a vehicle which may be selected from a two-way type in which the lumber support apparatus can be moved only forwards and rearwards and a four-way type in which the lumber support apparatus can be moved forwards, rearwards, upwards, and downwards.

In accordance with an aspect of the present invention, there is a lumber support apparatus installed in a seatback frame in an interior of a seatback of a vehicle, for supporting the back of a passenger, the lumber support apparatus comprising: a base plate installed in a fixed wire installed in the seatback frame to be elevated; nut units comprising a left nut and a right nut coupled to upper portions of opposite sides of the base plate to be slid leftwards and rightwards, respectively; link units comprising a left link and a right link located outside the nut units to be spaced apart from each other and ends of which are hinge-coupled to upper portions of opposite sides of the base plate, respectively; arm units comprising a left arm and a right arm leftward/rightward movements of which are restricted by the link units and raised forwards and rearwards when the nut units are slid; and a leftward/rightward screw rod having a screw structure passing the left nut and the right nut leftwards and rightwards to be screw-coupled to the left nut and the right unit, for moving the left nut and the right nut in opposite directions during rotation thereof.

The lumber support apparatus further comprises a leftward/rightward driving motor connected to one end of the leftward/rightward screw rod, for supplying a rotating force to the leftward/rightward screw rod.

The left nut is coupled to an upper portion of the left side of the base plate to be slid leftwards and rightwards, the right nut is coupled to an upper portion of the right side of the base plate to be slid leftwards and rightwards, the left link is located on the left side of the left nut to be spaced apart from the left nut such that one end of the left nut is hinge-coupled to an upper portion of the left side of the base plate, the right link is located on the right side of the right nut to be spaced apart from the right nut such that one end of the right nut is hinge-coupled to an upper portion of the right side of the base plate, an inner end of the left arm is hinge-coupled to the left nut such that an opposite end of the left link is hinge-coupled to a central portion of the left arm, and an inner end of the right arm is hinge-coupled to the right nut such that an opposite end of the right link is hinge-coupled to a central portion of the right arm.

The base plate comprises a center plate disposed at a central portion thereof, and a left plate and a right plate coupled to the left and right sides of the center plate, an upward/downward screw rod passing the center plate upwards and downwards is screw-coupled to the center plate, the upward/downward screw rod is rotatably fixed between an upper guide bracket and a lower guide bracket installed on upper and lower sides of a fixed wire, and a leftward/rightward driving motor for supplying a rotating force is provided at one end of the upward/downward screw rod.

An upper pad one end of which is coupled to an outer end of the left arm and an opposite end of which is coupled to an outer end of the right arm is provided.

The base plate comprises a center plate disposed at a central portion thereof, and a left plate and a right plate coupled to the left and right sides of the center plate, a plurality of wire fixing units for preventing forward/rearward separation of a guide wire are provided under the left plate and the right plate.

The base plate comprises a center plate disposed at a central portion thereof, and a left plate and a right plate coupled to the left and right sides of the center plate, a wire support unit for preventing upward/downward movement of a guide wire are provided under the left plate and the right plate.

The lumber support apparatus for a vehicle according to the present invention has the following advantages.

The back and waist of a user can be supported according to the body shape of the user by adjusting deformation of a comfort mat (that is, adjusting upward, downward, forward, and rearward locations of an upper pad) according to the body condition of the passenger, and accordingly, fatigues of the passenger seated on the seat after long time driving of the vehicle can be improved.

Both a two-way type and a four-way type can be applied by slightly modifying the shape of a guide wire.

Because stimuli can be prevented from being intensively applied to a specific portion of the back of a passenger due to the upper pad extending to the left and right sides of a comfort mat, an in-use feeling can be improved.

Manufacturing costs and manufacturing time can be reduced with a simple structure, and thus productivity can be improved.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
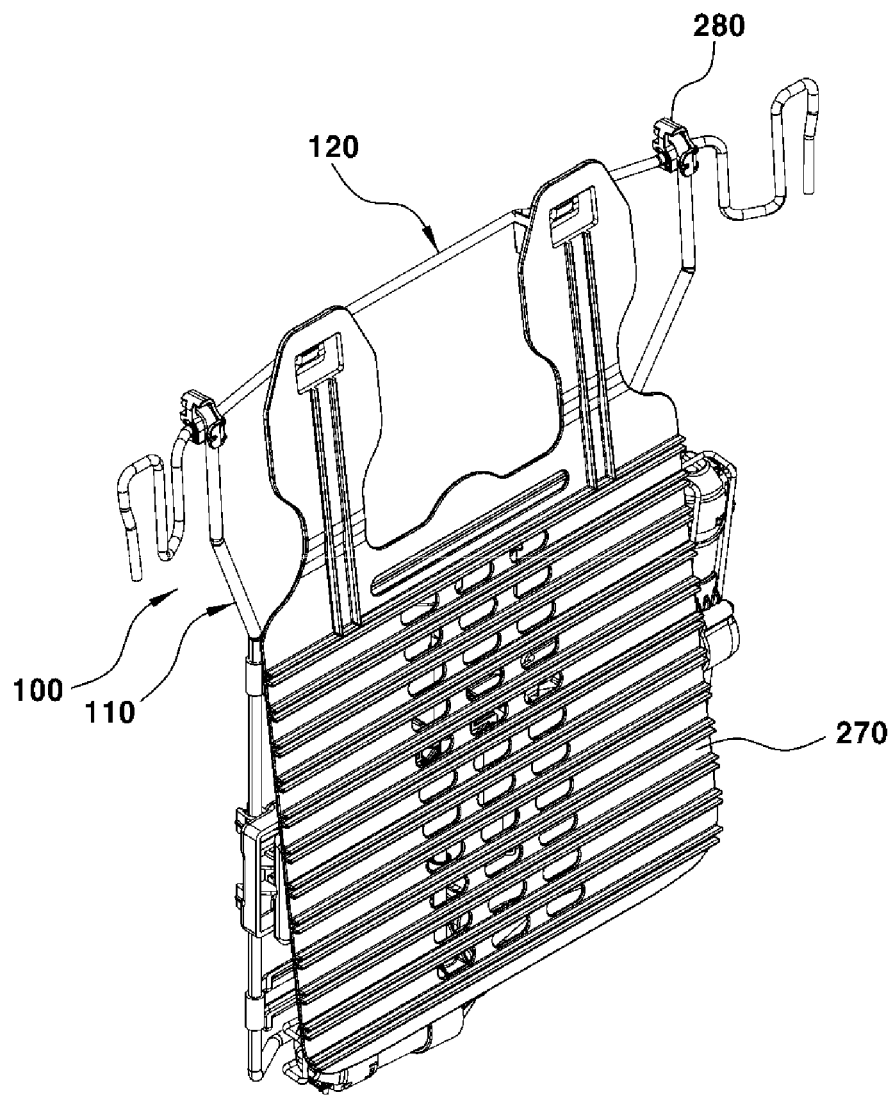
FIG. 1 and FIG. 2 are views showing a lumber support apparatus according to an exemplary embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, an exemplary embodiment of the present invention will be described with reference to the accompanying drawings so that those skilled in the art to which the present invention pertains can easily carry out the present invention.

The present invention relates to a lumber support apparatus installed in a seatback frame provided in the interior of a seatback of a vehicle, for supporting the back of a passenger, and is configured to support the back of a passenger in a form optimized according to the posture and the body condition of the passenger.

Figure 2:
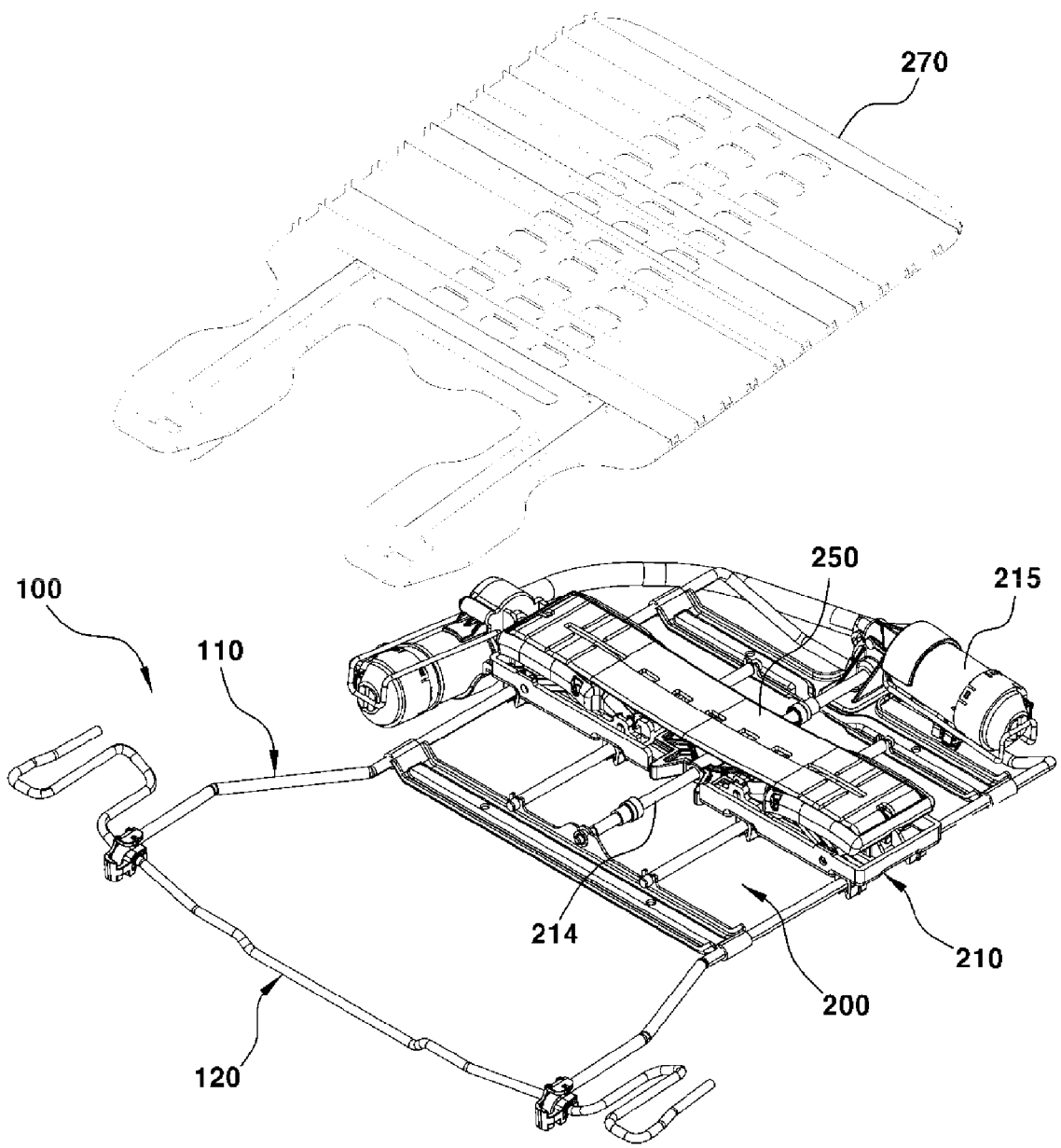
Figure 3:
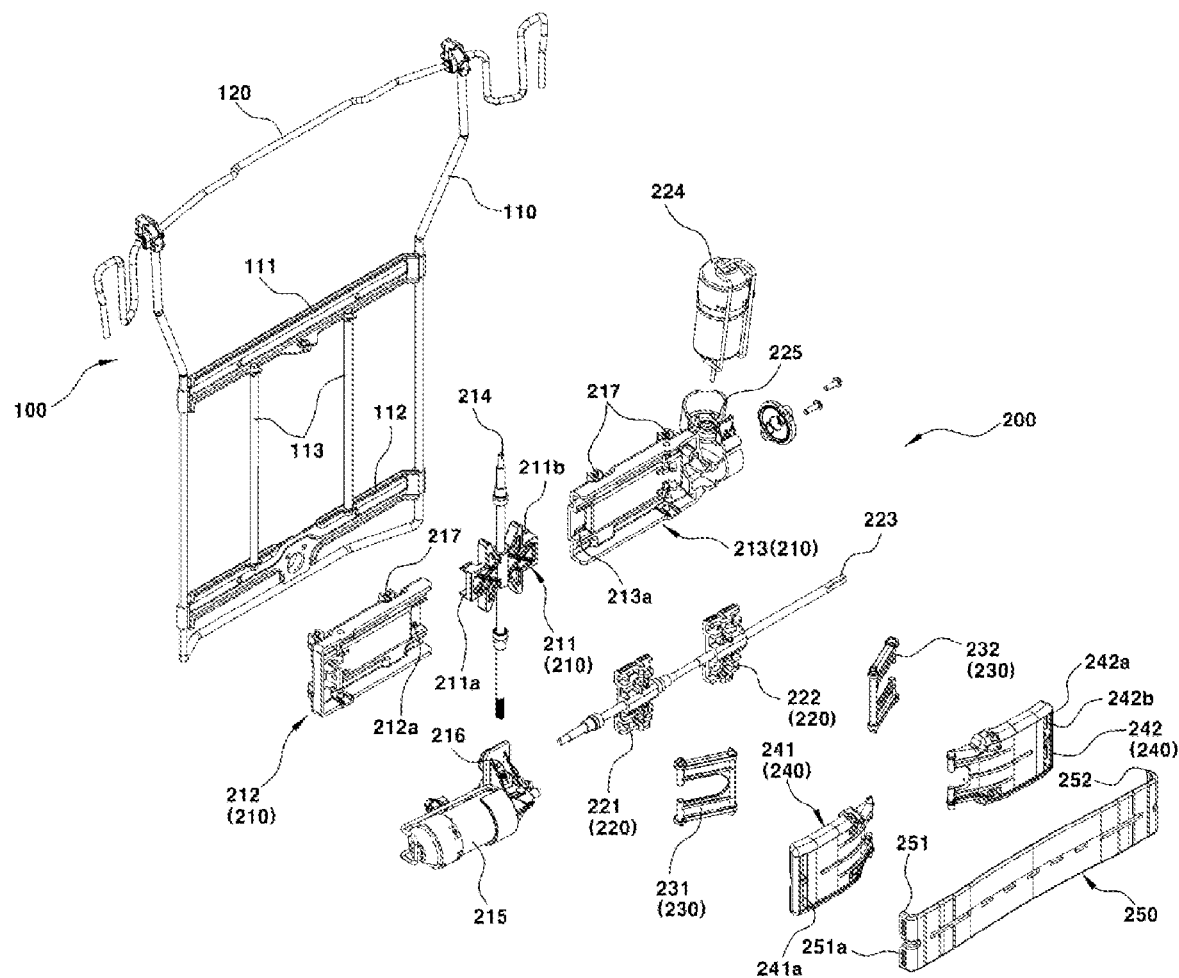
FIG. 3 is an exploded perspective view showing the lumber support apparatus according to the exemplary embodiment of the present invention.
Figure 4:
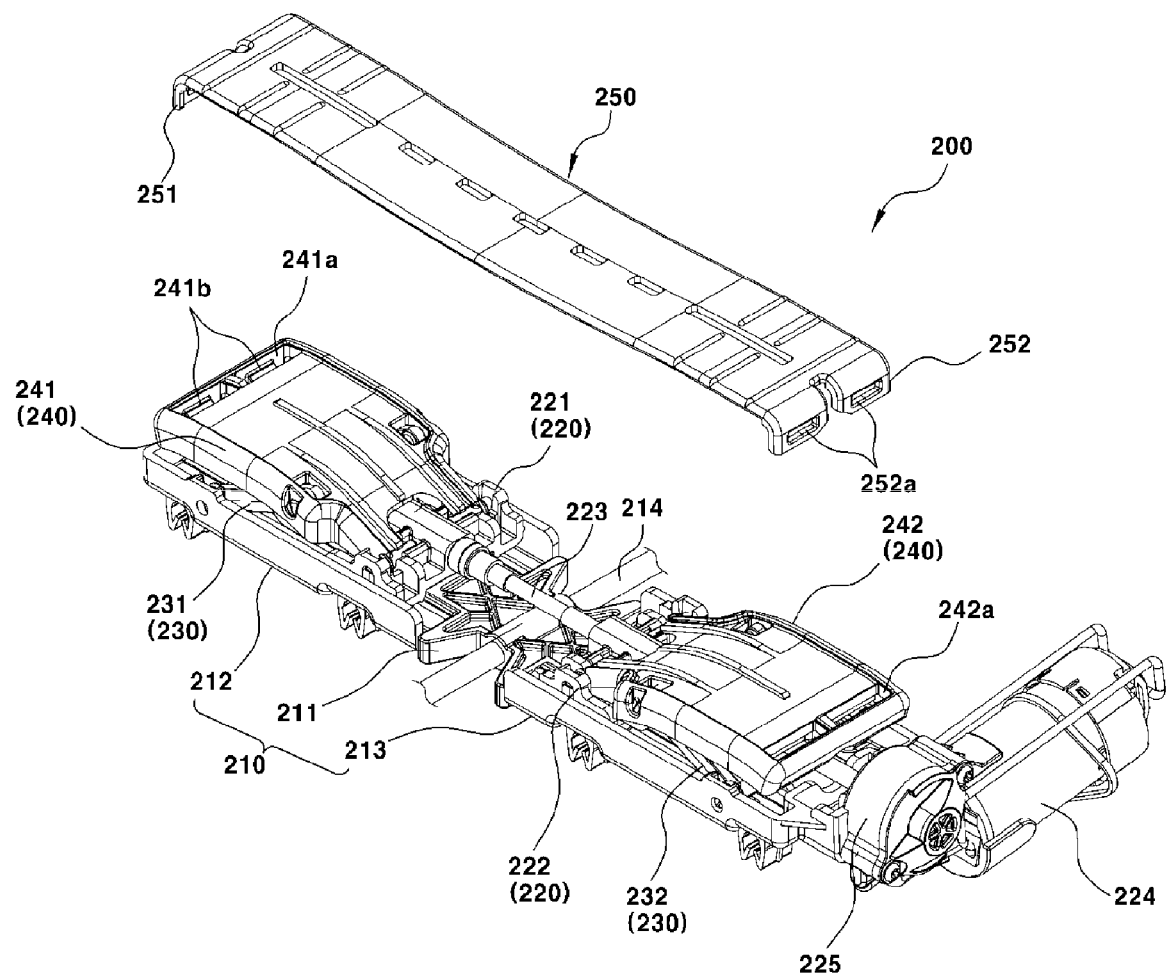
FIG. 4 is a partially coupled perspective view showing the lumber support apparatus according to the exemplary embodiment of the present invention.

As can be seen in FIGS. 1 to 3, the lumber support apparatus according to an exemplary embodiment of the present invention includes: a wire unit 100 fixedly installed in a seatback frame, and a support unit 200 coupled to the wire unit 100, for moving a comfort mat 270 in the forward and rearward directions of the back of a passenger or moving the comfort mat 270 upwards and downwards along the back of the passenger.

The wire unit 100 includes a fixed wire 110 and a cross wire 120, and the fixed wire 110 has an opened U-shaped upper end and the cross wire 120 is coupled to the opened upper end of the fixed wire 110 through a clip 280.

Although not shown in the drawings, the fixed wire 110 is coupled to the seatback frame through a fixed clip provided at a lower end thereof, and opposite ends of the cross wire 120 are coupled to opposite side surfaces of the seatback frame.

An upper end of the comfort mat 270 is rotatably coupled to the cross wire 120 such that the comfort mat 270 is rotated by the support unit 200 to move toward the back of the passenger or return to the original position. The comfort mat 270 protruding toward the back of the passenger supports the waist and the back of the passenger.

An upper guide bracket 111 extending from a lower side of the cross wire 120 leftwards and rightwards is coupled to an upper portion of the fixed wire 110, and a lower guide bracket 112 extending leftwards and rightwards is coupled to a lower portion of the fixed wire 110.

Then, an elevation distance of a base plate 210, which will be described below, is limited by the upper guide bracket 111 and the lower guide bracket 112.

As can be seen in FIG. 2, the base plate 210 constituting the support unit 200 includes a center plate 211 opposite ends of which are coupled to the fixed wire 110 to be elevated and disposed at the center of the base plate 210, and a left plate 212 and a right plate 213 coupled to left and right sides of the center plate 211.

Engaging bosses 211a and 211b inserted into coupling holes 212a and 213a formed inner ends of the left plate 212 and the right plate 213 (ends of the opposite ends of the left plate 212 and the right plate 213, which are disposed on the inner side of the base plate 210) protrude from opposite sides of a lower portion of the center plate 211.

The center plate 211 is configured such that the engaging bosses 211a and 211b are coupled to the left plate 212 and the right plate 213 while being inserted into the coupling holes 212a and 213a and opposite ends thereof are disposed under left and right screw rods 223 fixedly supported by the left plate 212 and the right plate 213 (which prevent forward and rearward separation of the left and right screw rods 223), whereby the coupled state of the left plate 212 and the right plate 213 can be maintained while separation of the left plate 212 and the right plate 213 can be prevented.

Guide structures for sliding a left nut 221 and a right nut 222 are formed at upper portions of the left plate 212 and the right plate 213.

The center plate 211 is screw-coupled to an upward/downward screw rod 214 passing through the center plate 211 upwards and downwards, and the upward/downward screw rod 214 is rotatably coupled between the upper guide bracket 111 and a upward/downward driving motor 215 such that the base plate 210 including the center plate 211 is elevated upwards and downwards during an operation of the upward/downward driving motor 215.

The upward/downward driving motor 215 is fixedly coupled to and supported by the lower guide bracket 112, and is located at a lower portion of the fixed wire 110.

Then, in order to improve a layout, the upward/downward driving motor 215 is disposed such that a motor shaft thereof is perpendicular to the upward/downward screw rod 214, and accordingly, a first direction conversion unit 216 for converting a rotation direction of the motor 215 and transmitting a rotating force of the motor 215 to the upward/downward screw rod 214 is installed between the upward/downward driving motor 215 and the upward/downward screw rod 214. Then, the first direction conversion unit 216 may include a gear unit, and for example, may be configured by using a bevel gear.

Nut units 220 including a left nut 221 and a right nut 222 slidably coupled to left and right sides of the base plate 210 are provided at upper portions of the left and right sides of the base plate 210.

That is, each of the nut units 220 includes a left nut 221 coupled to a left upper portion of the base plate 210 to be slid leftwards and rightwards, and a right nut 222 coupled to a right upper portion of the base plate 210 to be slid leftwards and rightwards.

For slide of the nut unit 220, a leftward/rightward screw rod 223 passes through the left nut 221 and the right nut 222 leftwards and rightwards to be screw-coupled to the left nut 221 and the right nut 222.

The left nut 221 is coupled to one of the left and right sides of the leftward/rightward screw rod 223 and the right nut 222 is coupled to the other of the left and right sides of the leftward/rightward screw rod 223, and because screw structures of opposite directions (for example, a right screw structure and a left screw structure) are formed at the one side of the leftward/rightward screw rod 223 to which the left nut 221 is coupled and the other side of the leftward/rightward screw rod 223 to which the right nut 222 is coupled, the left nut 221 and the right nut 222 are moved in opposite directions when the leftward/rightward screw rod 223 is rotated to be moved to the outside of the base plate 210 or to the inside of the base plate 210.

A leftward/rightward driving motor 224 for providing a driving force for rotation of the leftward/rightward screw rod 223 is coupled to one of the left and right ends of the leftward/rightward screw rod 223, and then the leftward/rightward driving motor 224 is disposed such that a motor shaft of the leftward/rightward driving motor 224 is perpendicular to the leftward/rightward screw rod 223 to improve the layout. Accordingly, a second direction conversion unit 225 for converting a rotation direction of the motor 224 and transmitting a rotating force to the leftward/rightward screw rod 223 is installed between the leftward/rightward driving motor 224 and the leftward/rightward screw rod 223. Then, the second direction conversion unit 225 may include a gear unit, and for example, may be configured by using a bevel gear.

Link units 230 including a left link 231 and a right link 232 located outside the base plate 210 to be spaced apart from the nut unit 220 and ends of which are hinge-coupled to upper portions of opposite sides of the base plate 210 are provided at upper portions of the left and right sides of the base plate 210.

That is, the link units 220 include a left link 221 located on the left side of the left nut 221 to be spaced apart from the left nut 221 and one end of which is hinge-coupled to an upper portion of the left side of the base plate 210, and a right link 221 located on the right side of the right nut 222 to be spaced apart from the right nut 222 and one end of which is hinge-coupled to an upper portion of the right side of the base plate 210.

Arm units 240 including a left arm 241 and a right arm 242 leftward/rightward movements of which are restricted by the link units 230 such that outer ends thereof (ends of the opposite ends which are disposed on the outside of the base plate 210) are raised forwards are provided at an upper portion of the base plate 210.

In detail, the arm units 240 include a left arm 241 an inner end (an end of the opposite ends of the left arm 241 disposed on the inside of the base plate 210) of which is hinge-coupled to the left nut 221 and having a central portion to which an inner end (an end of the opposite ends of the left arm 241 disposed on the outside of the base plate 210) of the left link 231 is hinge-coupled, and a right arm 242 an inner end (an end of the opposite ends of the right arm 242 disposed on the outside of the base plate 210) of which is hinge-coupled to the right nut 222 and having a central portion to which an inner end of the right link 232 is hinge-coupled.

An upper pad 250 facing the comfort mat 270 is coupled to the left arm 241 and the right arm 242. The upper pad 250 extends to the left and right sides of the comfort mat 270 such that opposite ends thereof is fixedly coupled to an outer end of the left arm 241 (an end of the opposite ends of the left arm 241 disposed outside the base plate 210) and an outer end of the right arm 242.

In more detail, the outer ends of the left arm 241 and the right arm 242 are rotatably coupled to the upper pad 250, and accordingly, coupling holes 241*a* and 242*a* into which ends of the upper pad 250 are formed at outer ends of the left arm 241 and the right arm 242 and arm coupling portions 252 and 252 are formed at opposite ends of the upper pad 250 to be bent so as to be inserted into the coupling holes 241*a* and 242*a*.

Latching holes 251*a* and 252*a* are formed in the arm coupling portions 251 and 252, and latching bosses 241*b* and 242*b* which are latched by the latching holes 251*a* and 252*a* to prevent separation of the upper pad 250 protrude from the coupling holes 241*a* and 242*a*. Then, the latching bosses 241*b* and 242*b* are provided so as not to interfere with rotations of the left arm 241 and the right arm 242.

The upper pad 250 pushes a lower portion of the comfort mat 270 toward the back of the passenger when the outer ends of the left arm 241 and the right arm 242 are raised forwards and protrude toward the back of the passenger, and improves an in-use feeling by preventing stimuli from being intensively applied to the back of the passenger by the outer ends of the left arm 241 and the right arm 242.

A plurality of wire fixing units 217 for preventing a guide wire 113 fixedly formed between the upper guide bracket 111 and the lower guide bracket 112 together with the fixed wire 110 from being separated from the base plate 210 forwards and rearwards are provided at lower portions of the left and right sides of the base plate 210, that is, lower portions of the left plate 212 and the right plate 213.

Figure 5:
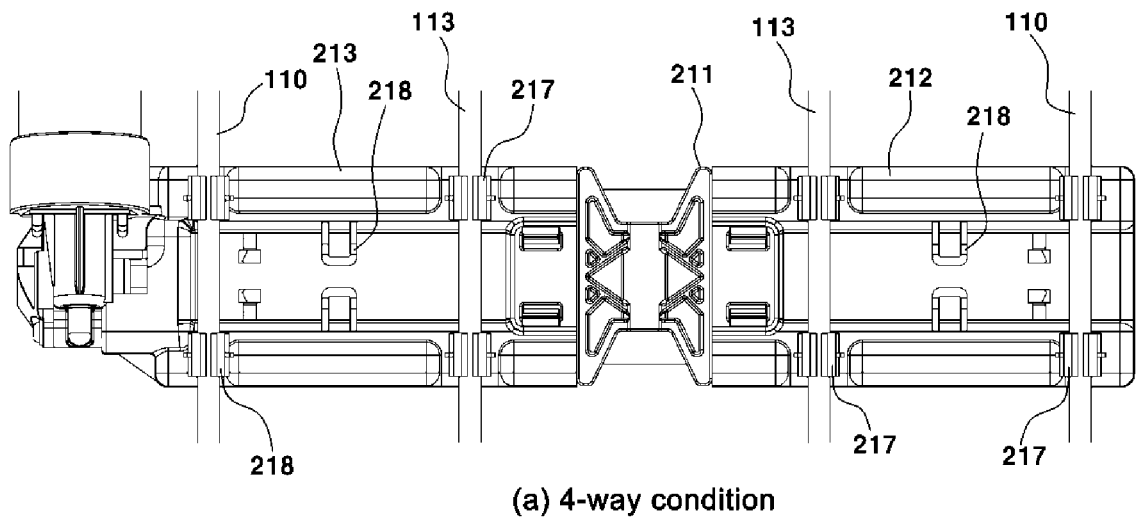
FIG. 5 is a view showing a rear surface structure of a base plate of the lumber support apparatus according to the exemplary embodiment of the present invention.
Figure 5:
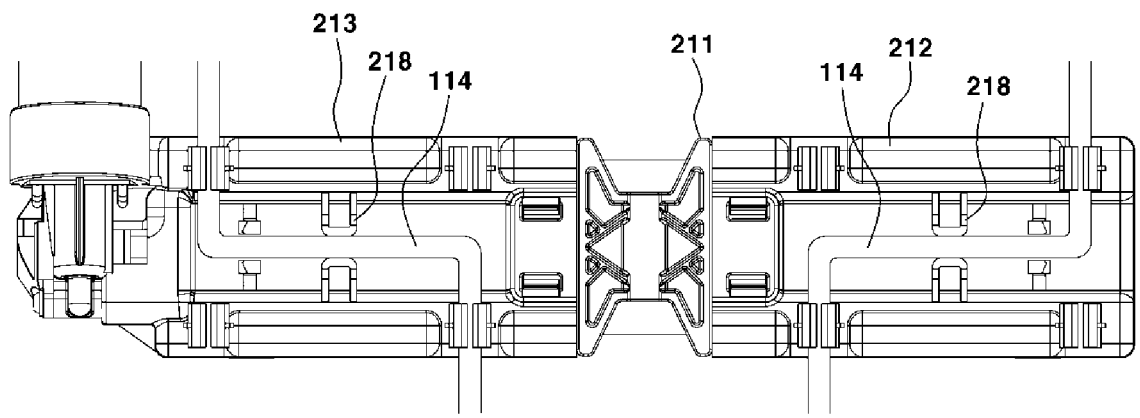

Referring to FIG. 5, the wire fixing units 217 are provided in a hook shape having an opening which may be resiliently widened so that the fixed wire 110 (or the guide wire) may be inserted through the opening but it is almost impossible to withdraw the fixed wire 110 (or the guide wire) through the opening.

Accordingly, the wire fixing units 217 allow upward/downward movement of the guide wire 113 and prevent forward/rearward movement of the guide wire 113, and prevent forward/rearward separation of the fixed wire 110 and the guide wire 113 and minimize frictions of the fixed wire 110 and the guide wire 113 when the base plate 210 is moved upwards and downwards at the same time.

Then, the guide wire 113 has a straight line shape extending upwards and downwards and is formed between the fixed wire 110 and the upward/downward screw rod 214, in order to guide and support upward/downward movement of the base plate 210, and then the support unit 200 may be operated in a four way type in which the upper pad 250 may be moved forwards, rearwards, upwards, and downwards.

Here, when the guide wire (two-way guide wire) 114, a central portion of which is continuously bent perpendicularly, is employed instead of the straight guide wire (four-way guide wire) 113, the support unit 200 may be operated in a two-way type in which the upper pad 250 can be moved forwards and rearwards.

Accordingly, by varying the types of the guide wires 113 and 114, the lumber support may be used in a two-way type only for a forward/rearward operation or may be used in a four-way type for both a forward/rearward operation and an upward/downward operation.

When the two-way guide wire 114 is used, the guide wire 114 is fixed by using a pair of wire fixing units 217 of the wire fixing units 217 formed at lower portions of the left plate 212 and the right plate 213, which are located on a diagonal line, and the fixed wire 110 is not mounted to the wire fixing units 217.

In addition, in order to prevent upward/downward movement of the two-way guide wire 114, wire support units 218 are provided at lower portions of the left plate 212 and the right plate 213, respectively.

The wire support units 218 prevent upward/downward movement of the guide wire 114 by adhering a central portion of the two-way guide wire 114 extending leftwards and rightwards to upper and lower sides thereof to support the two-way guide wire 114.

Hereinafter, an operation of the above-configured lumber support will be described with reference to FIGS. 6 and 7.

Figure 6:
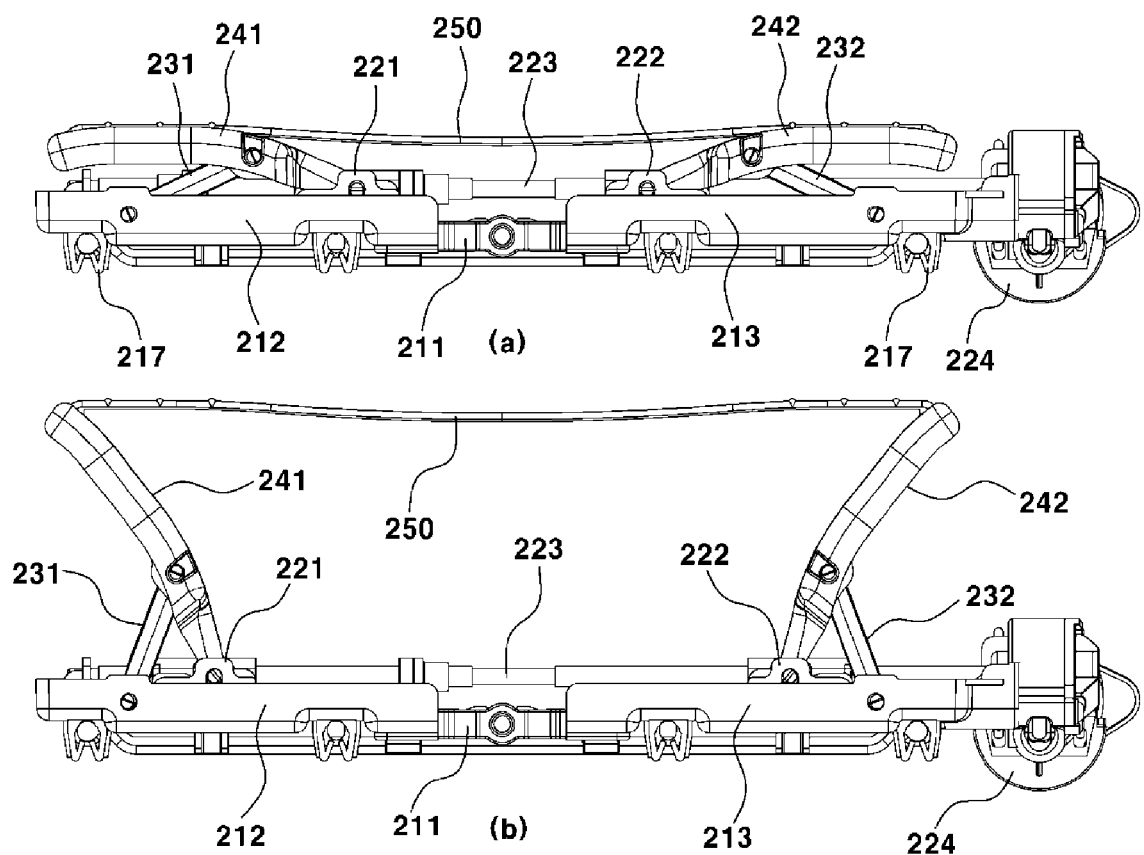
FIG. 6 and FIG. 7 are schematic views showing an operational state of the lumber support apparatus according to the exemplary embodiment of the present invention.

Referring to FIG. 6, if the leftward and rightward driving motor 224 connected to one side of the leftward/rightward screw rod 223 is driven such that the leftward/rightward screw rod 223 is rotated, the left nut 221 and the right nut 222 move in opposite directions to grow far away from each other or get close to each other, and inner ends of the left arm 241 and the right arm 242 move to the outside of the base plate 210 to grow far away from each other or move to the inside of the base plate 210 to get close to each other.

Then, inner ends of the left link 231 and the right link 232 are hinge-coupled to an intermediate portion of the left arm 241 and the right arm 242 such that leftward/rightward movements of the left arm 241 and the right arm 242 are restricted, and accordingly, outer ends of the left arm 241 and the right arm 242 move forwards toward the back of the passenger as leftward/rightward distances between inner ends of the left arm 241 and the right arm 242 and inner ends of the left link 231 and the right link 232 become smaller (or forward/rearward distances therebetween become larger), and to the contrary, outer ends of the left arm 241 and the right arm 242 move rearwards toward the back of the passenger as leftward/rightward distances between inner ends of the left arm 241 and the right arm 242 and inner ends of the left link 231 and the right link 232 become larger (or forward/rearward distances therebetween become smaller).

Accordingly, the upper pad 250 is moved forwards and rearwards to move a lower portion of the comfort mat contacting the upper pad 250 while facing the upper pad 250 forwards toward the back of the passenger or rearwards from the back of the passenger.

Figure 7:
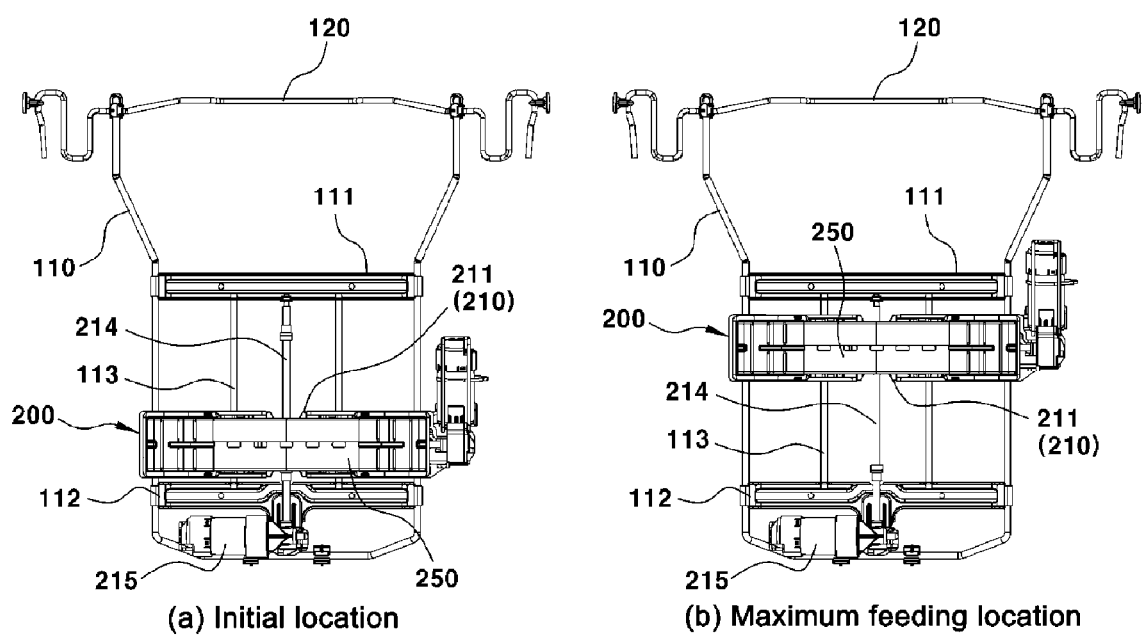

Meanwhile, referring to FIG. 7, if the upward/downward driving motor 215 connected to one side of the upward/downward screw rod 214 is operated such that the upward/downward screw rod 214 is rotated, the center plate 211 screw-coupled to the upward/downward screw rod 214 is moved upwards and downwards according to a rotation direction of the upward/downward screw rod 214, and accordingly, a portion of the upper pad 250 supporting the comfort mat may be moved upward and downwards while the base plate 210 is moved upwards and downwards so that a portion of the comfort mat supporting the back of the passenger is changed to optimally support the back of the passenger according to a posture and a body condition of the passenger.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A lumber support apparatus installed in a seatback frame in an interior of a seatback of a vehicle, for supporting the back of a passenger, the lumber support apparatus comprising:

a fixed wire installed in the seatback frame;
a base plate installed on the fixed wire installed in the seatback frame selectively elevated upwards along the fixed wire;
nut units comprising a left nut and a right nut coupled to upper portions of opposite sides of the base plate to be slid leftwards and rightwards of the seatback, respectively;
link units comprising a left link and a right link located in a lateral direction of the nut units to be spaced apart from each other and having ends of which are hinge-coupled to upper portions of opposite sides of the base plate, respectively;
arm units engaged to the nut units and the link units and comprising a left arm and a right arm, leftward/rightward movements of which are restricted by the link units wherein the arm units are raised forwards and rearwards when the nut units are slid; and
a leftward/rightward screw rod having a screw structure to be screw-coupled to the left nut and the right nut by passing the left nut and the right nut leftwards and rightwards, for moving the left nut and the right nut in opposite directions during rotation thereof, wherein an inner end of the left arm is hinge-coupled to the left nut such that an opposite end of the left link is hinge-coupled to a central portion of the left arm, and an inner end of the right arm is hinge-coupled to the right nut such that an opposite end of the right link is hinge-coupled to a central portion of the right arm, wherein the base plate comprises a center plate disposed at a central portion of the base plate, and a left plate and a right plate coupled to left and right sides of the center plate, wherein a plurality of wire fixing units, to which a guide wire is engaged, is provided under the left plate and the right plate for preventing forward/rearward separation of the guide wire, wherein a wire support unit to which the guide wire is engaged is provided between the wire fixing units under the left plate and the right plate for preventing upward/downward movement of the guide wire, and wherein the guide wire is fixedly formed between an upper guide bracket installed on an upper side of the fixed wire and a lower guide bracket installed on a lower side of the fixed wire.

2. The lumber support apparatus of claim 1, further comprising a leftward/rightward driving motor connected to a first end of the leftward/rightward screw rod, for supplying a rotating force to the leftward/rightward screw rod.

3. The lumber support apparatus of claim 1, wherein the left nut is coupled to an upper portion of the left side of the base plate to be slid leftwards and rightwards, the right nut is coupled to an upper portion of the right side of the base plate to be slid leftwards and rightwards, the left link is located on the left side of the left nut to be spaced apart from the left nut such that a first end of the left link is hinge-coupled to an upper portion of the left side of the base plate, the right link is located on the right side of the right nut to be spaced apart from the right nut such that a first end of the right link is hinge-coupled to an upper portion of the right side of the base plate.

4. The lumber support apparatus of claim 1, wherein an upper pad having a first end of which is coupled to an outer end of the left arm and an opposite end of which is coupled to an outer end of the right arm is provided.

* * * * *